United States Patent
Luo et al.

(10) Patent No.: US 11,313,743 B2
(45) Date of Patent: Apr. 26, 2022

(54) TACTILE SENSOR

(71) Applicant: Wuyi University, Jiangmen (CN)

(72) Inventors: Jianyi Luo, Jiangmen (CN); Jingcheng Huang, Jiangmen (CN); Guoning Chen, Jiangmen (CN); Songhui Li, Jiangmen (CN); Xiaoyan Hu, Jiangmen (CN); Baowen Liang, Jiangmen (CN); Jinxiu Wen, Jiangmen (CN)

(73) Assignee: Wuyi University, Jiangmen (CN)

( * ) Notice: Subject to any disclaimer, the term of this patent is extended or adjusted under 35 U.S.C. 154(b) by 217 days.

(21) Appl. No.: 16/753,228

(22) PCT Filed: Feb. 13, 2019

(86) PCT No.: PCT/CN2019/074936
§ 371 (c)(1),
(2) Date: Apr. 2, 2020

(87) PCT Pub. No.: WO2020/155193
PCT Pub. Date: Aug. 6, 2020

(65) Prior Publication Data
US 2021/0215553 A1    Jul. 15, 2021

(30) Foreign Application Priority Data

Feb. 2, 2019   (CN) .......................... 201910106800.4

(51) Int. Cl.
*G01L 1/20*     (2006.01)
*G01K 1/14*     (2021.01)
(Continued)

(52) U.S. Cl.
CPC .............. *G01L 1/205* (2013.01); *G01K 1/026* (2013.01); *G01K 1/14* (2013.01); *G01K 7/18* (2013.01);
(Continued)

(58) Field of Classification Search
CPC ....... G01L 1/205; G01L 1/2287; G01K 1/026; G01K 1/14; G01K 7/18; G01K 1/143; G01K 7/16
See application file for complete search history.

(56) References Cited

U.S. PATENT DOCUMENTS 4,503,416 A * 3/1985 Kim ....................... B25J 13/081
                                                 178/18.05
4,795,998 A * 1/1989 Dunbar ................ H01H 13/785
                                                    338/5
(Continued)

FOREIGN PATENT DOCUMENTS

CN         106568539 A     4/2017
CN         106595940 A     4/2017
(Continued)

*Primary Examiner* — Lisa M Caputo
*Assistant Examiner* — Philip L Cotey
(74) *Attorney, Agent, or Firm* — Vivacqua Crane PLLC

(57) ABSTRACT

A new tactile sensor having a sensing layer, and the sensing layer includes a flexible substrate, at least one stress sensing unit, and at least one temperature sensing unit. The stress sensing unit includes a flexible conductive fiber, a top electrode, and a bottom electrode, the flexible conductive fiber is laid flat on the flexible substrate, the top electrode is bendable, and when there is a potential difference between the top electrode and the bottom electrode, a current flows along a radial direction of the flexible conductive fiber; and the temperature sensing unit includes a thermal conductive fiber and two end electrodes, the thermal conductive fiber is laid flat on the flexible substrate, and when there is a potential difference between the two end electrodes, a current flows along an axial direction of the thermal conductive fiber.

9 Claims, 3 Drawing Sheets

(51) Int. Cl.
  *G01K 1/02*  (2021.01)
  *G01K 7/18*  (2006.01)
  *G01K 7/16*  (2006.01)
  *G01L 1/22*  (2006.01)
  *G01K 1/143*  (2021.01)

(52) U.S. Cl.
  CPC .............. *G01K 1/143* (2013.01); *G01K 7/16* (2013.01); *G01L 1/2287* (2013.01)

(56) References Cited

U.S. PATENT DOCUMENTS

| | | | | |
|---|---|---|---|---|
| 9,052,775 | B1* | 6/2015 | Salisbury | G01L 5/226 |
| 10,401,240 | B2* | 9/2019 | Lee | G01L 1/20 |
| 10,945,663 | B2* | 3/2021 | Bozkurt | G01N 27/048 |
| 2006/0260417 | A1* | 11/2006 | Son | G01L 5/228 |
| | | | | 73/862.046 |
| 2009/0033341 | A1* | 2/2009 | Son | G01L 1/146 |
| | | | | 324/663 |
| 2009/0128168 | A1* | 5/2009 | Qi | H01B 1/124 |
| | | | | 324/693 |
| 2009/0272201 | A1* | 11/2009 | Loeb | G01L 5/228 |
| | | | | 73/862.041 |
| 2009/0309172 | A1* | 12/2009 | Liu | G01L 1/205 |
| | | | | 257/415 |
| 2010/0170886 | A1* | 7/2010 | Qi | H01B 1/124 |
| | | | | 219/482 |
| 2011/0036181 | A1* | 2/2011 | Fritzsche | B25J 13/084 |
| | | | | 73/862.046 |
| 2013/0168336 | A1* | 7/2013 | Kim | G01L 1/205 |
| | | | | 211/26 |
| 2014/0192005 | A1* | 7/2014 | Wakuda | G06F 3/016 |
| | | | | 345/173 |
| 2016/0259473 | A1* | 9/2016 | Kim | G01N 33/0001 |
| 2017/0059426 | A1* | 3/2017 | Choi | G01L 5/00 |
| 2017/0067757 | A1* | 3/2017 | Choi | G01D 5/2405 |
| 2017/0167928 | A1* | 6/2017 | Lee | G01L 1/2268 |
| 2017/0356815 | A1* | 12/2017 | Madden | A61B 5/0205 |
| 2018/0160979 | A1* | 6/2018 | Kim | G01L 1/205 |
| 2018/0172527 | A1* | 6/2018 | Kim | G01L 5/1627 |
| 2018/0329535 | A1* | 11/2018 | Vallett | G06F 3/0416 |
| 2018/0340847 | A1* | 11/2018 | Pan | A61B 5/6804 |
| 2020/0180264 | A1* | 6/2020 | Thostenson | G01M 5/0083 |
| 2021/0181002 | A1* | 6/2021 | Huang | H04R 17/025 |
| 2021/0215553 | A1* | 7/2021 | Luo | G01L 1/205 |

FOREIGN PATENT DOCUMENTS

| | | |
|---|---|---|
| CN | 107462343 A | 12/2017 |
| CN | 207619571 U | 7/2018 |
| CN | 109141687 A | 1/2019 |
| JP | 2003033262 A | 2/2003 |

* cited by examiner

TACTILE SENSOR

CROSS REFERENCE TO RELATED APPLICATIONS

This application is a national stage application under 35 U.S.C. 371 of PCT Application No. PCT/CN2019/074936, filed on 13 Feb. 2019, which PCT application claimed the benefit of Chinese Patent Application No. 2019101068004, filed on 2 Feb. 2019, the entire disclosure of each of which are hereby incorporated herein by reference.

TECHNICAL FIELD

The present disclosure relates to the field of sensor technologies, and in particular, to a new tactile sensor.

BACKGROUND

With the development of science and technology and people's demand for a good life, the fields of wearable electronic products, artificial intelligence, and robotics are rapidly developed. To achieve better human-computer interaction experience, a robot needs to respond quickly and sensitively to external stimuli. As a "skin" of a robot, a tactile sensor has become a realistic technical demand. The tactile sensor needs to be capable of sensitively responding to external temperatures and stress and providing flexible, lightweight, and arrayed functions.

An existing knittable tactile sensor basically modifies a function layer of a textile fiber by using a micronano material. Such implementation can effectively improve sensitivity of the sensor. However, as the micronano material is difficult to implement good uniformity and structural stability, such a tactile sensor can hardly be compatible with an existing textile technology, and needs to be packaged in an elastomer such as silicone to protect the micronano material. Consequently, an area of a single sensor is excessively large, and it is difficult to truly implement high integration and a high resolution. These problems become constraints on market promotion of this technology. In addition, currently, some patents involves using a cross-knot formed by two flexible fibers in a sensor as a sensing unit. Although such a sensor has good stress sensing performance and can be compatible with the textile technology, a deviation, a dislocation, or even a fracture of the fibers in the cross-knot can be easily caused when non-vertical stress is applied, resulting in problems such as instable sensor performance and initial resistance drift. As a result, a temperature sensing function cannot be further integrated, and tactile sensing cannot be effectively implemented.

Therefore, a knittable tactile sensor with high stability and high sensitivity is an urgent demand for the development of intelligent wearable electronic products.

SUMMARY

For a drawback in an existing technology, an objective of the present disclosure is to provide a new tactile sensor. The new tactile sensor can detect stress and a temperature independently at the same time, and is advantageous as it is highly stable, highly sensitive, flexible, lightweight, arrayed, and the like.

The technical solutions used in the present disclosure are as follows:

A new tactile sensor includes a sensing layer including a flexible substrate, at least one stress sensing unit, and at least one temperature sensing unit;

the stress sensing unit includes a flexible conductive fiber, a top electrode, and a bottom electrode, the flexible conductive fiber is laid flat on the flexible substrate, the top electrode is bendable and is in electrical contact with a top of the flexible conductive fiber, the bottom electrode is in electrical contact with a bottom of the flexible conductive fiber, and when there is a potential difference between the top electrode and the bottom electrode, a current flows along a radial direction of the flexible conductive fiber; and the temperature sensing unit includes a thermal conductive fiber and two end electrodes, the thermal conductive fiber is laid flat on the flexible substrate, the two end electrodes are respectively and electrically connected to two ends of the thermal conductive fiber, and when there is a potential difference between the two end electrodes, a current flows along an axial direction of the thermal conductive fiber.

A working principle of the tactile sensor in the present disclosure is as follows:

When external stress (for example, in a direction perpendicular to the flexible substrate) is applied to the flexible conductive fiber of the stress sensing unit, the flexible conductive fiber is structurally deformed under action of the stress accordingly, and consequently a radial resistance of the flexible conductive fiber changes. As such, stress can be detected by detecting such a resistance change (for example, detecting a voltage change between the top electrode and the bottom electrode). A resistance of the thermal conductive fiber of the temperature sensing unit changes with a temperature, and therefore a temperature can be detected by detecting a resistance of the thermal conductive fiber (for example, detecting a resistance between two ends of the thermal conductive fiber).

The resistance change generated when the stress acts on the flexible conductive fiber is caused by the structural deformation, and no additional function layer modification needs to be performed on a surface of the flexible conductive fiber. Therefore, a problem of poor stability of a function layer in an existing technology can be properly avoided. In addition, using a single flexible conductive fiber as a stress response element can further avoid an existing problem that a cross-knot formed by two flexible fibers easily shifts under action of stress, thereby facilitating sensor stability and miniaturization, and ensuring compatibility with an existing textile technology. In addition, in the stress sensing unit, the bendable top electrode is in electrical contact with the top of the flexible conductive fiber, and the bottom electrode is in electrical contact with the bottom of the flexible conductive fiber. As such, under action of stress, especially stress perpendicular to a direction of the flexible substrate, the electrical contact between the flexible conductive fiber and each of the top electrode and the bottom electrode can always be maintained.

In the present disclosure, the stress sensing unit and the temperature sensing unit are both disposed in the tactile sensor, and a contact position between the flexible conductive fiber and each of the top electrode and the bottom electrode and a contact position between the thermal conductive fiber and each of the two end electrodes are designed, so as to ensure that current directions of the flexible conductive fiber and the thermal conductive fiber are different. As such, stress and a temperature can be independently detected at the same time, and a conductive fiber can be used as a response element for the stress sensing unit and the temperature sensing unit. Such practice facilitates flexibility and lightweight performance of the sensor, and improves detection sensitivity. A solution compatible with a textile technology can realize the distribution of multiple tactile sensors in a small area, and is characterized by miniaturization, integration, and an arrayed arrangement.

Further, a resistance of the thermal conductive fiber is characterized by a negative temperature coefficient.

Further, the thermal conductive fiber is a carbon fiber doped with impurity ions, or is a composite fiber obtained by blending an aramid fiber with a carbon fiber doped with impurity ions.

Ion doping (such ion doping means that impurity ions are inevitably introduced into the material, or more impurity ions are added to the material through additional doping treatment) and high-temperature carbonization processing are successively performed on a textile fiber material, to obtain a carbon fiber doped with impurity ions as the thermal conductive fiber. Alternatively, a carbon fiber doped with impurity ions is blended with an aramid fiber to obtain a composite fiber with stronger tensile strength and good conductivity as the thermal conductive fiber. When a carbon fiber doped with impurity ions is used, because the impurity ions are uniformly doped in the thermal conductive fiber, electron transfer is subject to scattering of the impurity ions in the material, which affects electron transfer rates at different temperatures. Macroscopically, a specific correspondence between a resistance of the material and a temperature is presented, so that the thermal conductive fiber can implement temperature sensing.

Further, flexible conductive fibers of all stress sensing units and thermal conductive fibers of all temperature sensing units share a same conductive fiber. Because current directions of the stress sensing unit and the temperature sensing unit are different, the stress sensing unit and the temperature sensing unit can work independently of each other.

Further, the sensing layer includes one stress sensing unit and one temperature sensing unit, and the flexible conductive fiber of the stress sensing unit and the thermal conductive fiber of the temperature sensing unit are respectively selected from two separated segments of a same conductive fiber. Such arrangement herein helps improve integration between the stress sensing unit and the temperature sensing unit on the flexible substrate, thereby facilitating miniaturization of the sensor, and further ensuring that the stress sensing unit and the temperature sensing unit can work independently of each other. In the stress sensing unit, the top electrode is disposed on a middle portion of the flexible conductive fiber, and is in contact with a top surface of the flexible conductive fiber, and the bottom electrode is in contact with bottom surfaces of two ends of the flexible conductive fiber. Such arrangement herein can avoid contact between the top electrode and the bottom electrode caused by a shift of the top electrode and the bottom electrode under action of stress, so as to prevent a short circuit.

Further, a ratio of a length of the thermal conductive fiber of the temperature sensing unit to a diameter of the flexible conductive fiber of the stress sensing unit is greater than 20:1.

A current in the flexible conductive fiber flows in the radial direction of the flexible conductive fiber, and an electron transfer direction of the flexible conductive fiber is different from that of the thermal conductive fiber. In addition, an electron transfer path of the flexible conductive fiber is much shorter than that of the thermal conductive fiber, and is less affected by scattering of impurity ions. Therefore, a resistance of the flexible conductive fiber is not affected by a temperature, and a temperature and stress can be independently detected by using a peripheral circuit without mutual interference.

Further, hardening processing is performed on the thermal conductive fiber, to prevent a resistance of the thermal conductive fiber from being changed due to impact of stress. Regardless of various physical impact on a surface, temperature sensing performance of a material of the thermal conductive fiber is not affected, and temperature measurement accuracy thereof is improved.

Further, the top electrode is a metal dome, liquid metal, or conductive silver paste. Therefore, the top electrode can be bent and deformed with the flexible conductive fiber under action of stress, so as to maintain electrical contact with the top of the flexible conductive fiber.

Further, the stress sensing unit and the temperature sensing unit are not in contact with each other; in the stress sensing unit, the flexible conductive fiber does not intersect or is not in contact with the flexible conductive fiber itself, and the top electrode and the bottom electrode are not in contact with each other; and in the temperature sensing unit, the thermal conductive fiber does not intersect or is not in contact with the thermal conductive fiber itself, and the two end electrodes are not in contact with each other. Such arrangement herein ensures that the stress sensing unit and the temperature sensing unit work independently of each other, and also prevents a short circuit.

Further, the new tactile sensor further includes an elastic layer and a stress-bearing layer that are disposed on the sensing layer, where the elastic layer is annular and is arranged along an edge of the flexible substrate, and the stress-bearing layer is disposed on the elastic layer and covers the flexible substrate. The elastic layer and the stress-bearing layer are configured to protect the sensor from external interference.

The following describes the present disclosure in detail with reference to the accompanying drawings for better understanding and implementation.

EXPLANATION OF REFERENCE NUMERALS

Figure 1:
FIG. 1 is a schematic diagram of an overall cross-section of a new tactile sensor according to the present disclosure.

10: stress-bearing layer; 20: elastic layer; 30: sensing layer; 31: flexible substrate; 32: conductive fiber; 33: top electrode; 34 and 35: end electrodes; 36: bottom electrode; and 37: substrate conductive layer.

DETAILED DESCRIPTION

In the description of the present disclosure, it should be noted that directions and position relationships indicated by orientation words such as terms "center", "X-axis (X)", "Y-axis (Y)", "Z-axis (Z)", "length", "width", "thickness", "up", "down", "front", "back", "left", "right", "vertical", "horizontal", "top", "bottom", "inside", "outside", "clockwise", "counter clockwise", and the like are based on directions or position relationships shown by the accompanying drawings, which are used only for describing the present disclosure and for description simplicity, but do not indicate or imply that an indicated apparatus or element must have a specific orientation or must be constructed and operated in a specific orientation. Therefore, these cannot be understood as a limitation on the present disclosure.

A new tactile sensor provided in the present disclosure includes a sensing layer including a flexible substrate, at least one stress sensing unit, and at least one temperature sensing unit;

the stress sensing unit includes a flexible conductive fiber, a top electrode, and a bottom electrode, the flexible conductive fiber is laid flat on the flexible substrate, the top electrode is bendable and is in electrical contact with a top of the flexible conductive fiber, the bottom electrode is in electrical contact with a bottom of the flexible conductive fiber, and when there is a potential difference between the top electrode and the bottom electrode, a current flows along a radial direction of the flexible conductive fiber; and the temperature sensing unit includes a thermal conductive fiber and two end electrodes, the thermal conductive fiber is laid flat on the flexible substrate, the two end electrodes are respectively and electrically connected to two ends of the thermal conductive fiber, and when there is a potential difference between the two end electrodes, a current flows along an axial direction of the thermal conductive fiber.

A working principle of the tactile sensor in the present disclosure is as follows:

When external stress (for example, in a direction perpendicular to the flexible substrate) is applied to the flexible conductive fiber of the stress sensing unit, the flexible conductive fiber is structurally deformed under action of the stress accordingly, and consequently a radial resistance of the flexible conductive fiber changes. As such, stress can be detected by detecting such a resistance change (for example, detecting a voltage change between the top electrode and the bottom electrode). A resistance of the thermal conductive fiber of the temperature sensing unit changes with a temperature, and therefore a temperature can be detected by detecting a resistance of the thermal conductive fiber (for example, detecting a resistance between two ends of the thermal conductive fiber).

Embodiment 1

Referring to FIG. 1, a new tactile sensor in this embodiment includes a stress-bearing layer 10, an elastic layer 20, and a sensing layer 30 that are sequentially stacked from top to bottom.

Referring to FIG. 2 to FIG. 6, in this embodiment, the sensing layer 30 includes a flexible substrate 31, one stress sensing unit, and one temperature sensing unit, and the stress sensing unit and the temperature sensing unit are separately disposed on the flexible substrate 31.

The flexible substrate 31 uses a flexible film material, for example, a conventional film material such as polyethylene terephthalate (PET), polyimide (PI), polydimethylsiloxane (PDMS), or the like.

Figure 3:
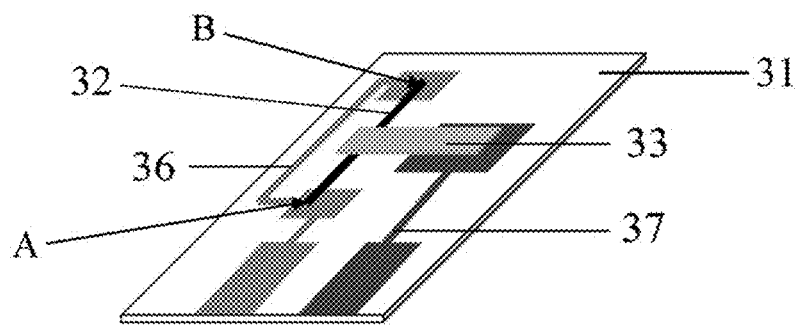
FIG. 3 is a schematic structural diagram of a stress sensing unit.
Figure 4:
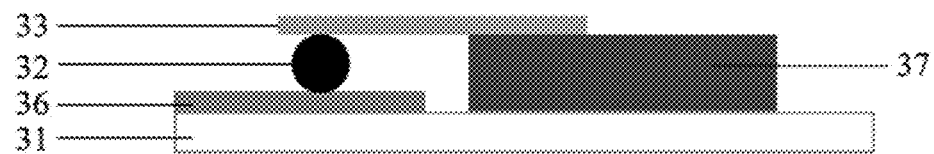
FIG. 4 is a side view of a stress sensing unit.

As shown in FIG. 3 and FIG. 4, the stress sensing unit includes a flexible conductive fiber, a top electrode 33, and a bottom electrode 36. The flexible conductive fiber is laid flat on the flexible substrate 31. The top electrode 33 is bendable and is in electrical contact with a top of the flexible conductive fiber. The bottom electrode 36 is in electrical contact with a bottom of the flexible conductive fiber. When there is a potential difference between the top electrode 33 and the bottom electrode 36, a current flows along a radial direction of the flexible conductive fiber, that is, the current flows from the top of the flexible conductive fiber to the bottom along a diameter direction of the flexible conductive fiber (in this case, a potential of the top electrode 33 is higher than a potential of the bottom electrode 36), or flows from the bottom of the flexible conductive fiber to the top along the diameter direction of the flexible conductive fiber (in this case, a potential of the top electrode 33 is lower than a potential of the bottom electrode 36).

The top electrode 33 is a bendable and deformable conductive material such as a metal dome, liquid metal, or conductive silver paste, and can be bent with deformation of the flexible conductive fiber.

Figure 5:
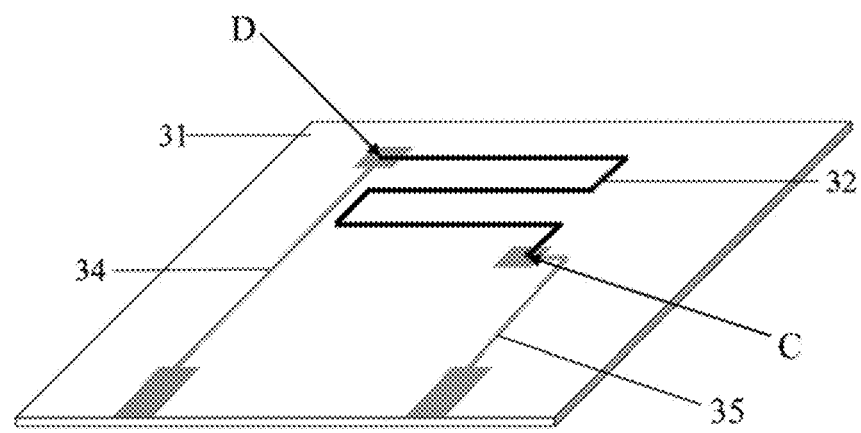
FIG. 5 is a schematic structural diagram of a temperature sensing unit.
Figure 6:
FIG. 6 is a side view of a temperature sensing unit.

As shown in FIG. 5 and FIG. 6, the temperature sensing unit includes a thermal conductive fiber and two end electrodes 34 and 35, the thermal conductive fiber is laid flat on the flexible substrate 31, the two end electrodes 34 and 35 are respectively and electrically connected to two ends of the thermal conductive fiber, and when there is a potential difference between the two end electrodes 34 and 35, a current flows along an axial direction of the thermal conductive fiber.

Hardening processing is performed on a surface of the thermal conductive fiber, to prevent a resistance of the thermal conductive fiber from being changed due to impact of stress. Specifically, a hardener can be used for the processing, so that when the thermal conductive fiber is subject to stress, the thermal conductive fiber is not deformed and thus its resistance does not change. Therefore, the resistance of the thermal conductive fiber is affected only by a temperature, thereby improving temperature measurement accuracy thereof.

Figure 2:
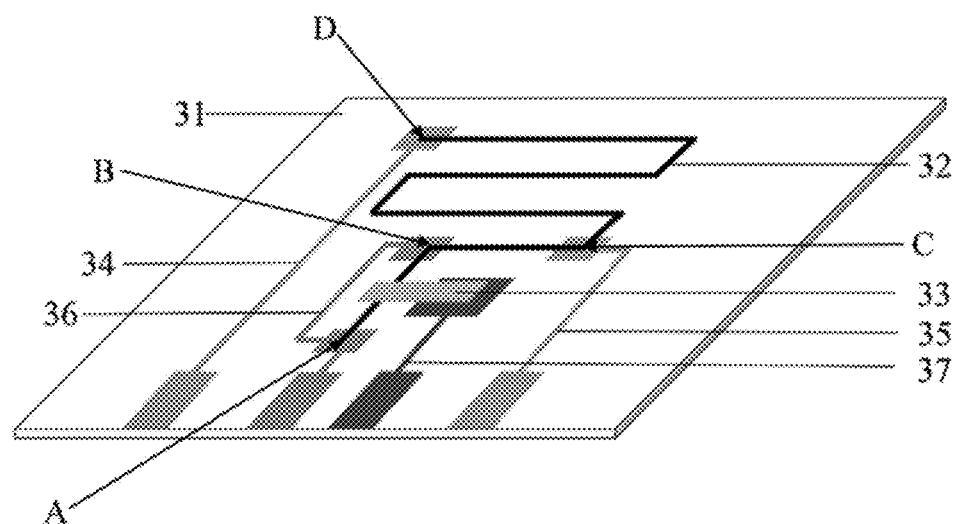
FIG. 2 is a schematic structural diagram of a sensing layer.

In this embodiment, the flexible conductive fiber of the stress sensing unit and the thermal conductive fiber of the temperature sensing unit are respectively selected from two separated segments of a same conductive fiber 32, specifically, two end segments of the same conductive fiber 32. As shown in FIG. 2, a segment (segment AB) between point A and point B in the conductive fiber 32 is selected as the flexible conductive fiber of the stress sensing unit, and point A is located at one end of the conductive fiber 32. A segment (segment CD) between point C and point D in the conductive fiber 32 is selected as the thermal conductive fiber of the temperature sensing unit, and point D is located at the other end of the conductive fiber 32. The flexible conductive fiber of the stress sensing unit is separated from the thermal conductive fiber of the temperature sensing unit by a middle segment (segment BC), so as to further ensure that currents in the flexible conductive fiber and the thermal conductive fiber are independent of each other, thereby ensuring that the stress sensing unit and the temperature sensing unit can work independently of each other.

The conductive fiber 32 is laid flat on a surface of the flexible substrate 31, that is, an axial direction of the conductive fiber 32 is parallel with the surface of the flexible substrate 31, and the conductive fiber 32 does not intersect or is not knotted with the conductive fiber 32 itself, so as to prevent a short circuit. Preferably, the conductive fiber 32 is bent and disposed on a middle portion of the flexible substrate 31, thereby facilitating miniaturization of the sensor.

The conductive fiber 32 is flexible, and is preferably a carbon fiber doped with impurity ions, or a composite fiber obtained by blending an aramid fiber with a carbon fiber doped with impurity ions. There are multiple types of impurity ions, and the impurity ions are inevitably introduced into the carbon fiber obtained in a carbon fiber material preparation process, or more impurity ions are doped into the carbon fiber after doping treatment. Specifically, a resistance of the conductive fiber 32 is characterized by a negative temperature coefficient.

Further, in the conductive fiber 32, a ratio of a length of the thermal conductive fiber (segment CD) of the temperature sensing unit to a diameter of the flexible conductive fiber (segment AB) of the stress sensing unit is greater than 20:1. Specifically, a length of the conductive fiber 32 is preferably 10 cm.

As shown in FIG. 3 and FIG. 4, in the stress sensing unit, the top electrode 36 is disposed on a middle portion of the flexible conductive fiber, and is in contact with a top surface of the flexible conductive fiber. The bottom electrode 36 is disposed between the surface of the flexible substrate 31 and the flexible conductive fiber, and is in contact with bottom surfaces of two ends of the flexible conductive fiber. Further, the stress sensing unit further includes a substrate conductive layer 3. The substrate conductive layer 37 is disposed between the top electrode 33 and the surface of the flexible substrate 31, is configured to support the top electrode 33, and is in electrical contact with a bottom of the top electrode 33. Preferably, the bottom electrode 36 extends to an edge of the flexible substrate 31, and the substrate conductive layer 37 extends to an edge of the flexible substrate 31, so that the stress sensing unit is electrically connected to an external power supply system.

In addition, the flexible conductive fiber does not intersect or is not in contact with the flexible conductive fiber itself, the top electrode 33 and the bottom electrode 36 are not in contact with each other, and the substrate conductive layer 37 and the bottom electrode 36 are not in contact with each other. Preferably, the top electrode 33 does not intersect the bottom electrode 36 in a direction perpendicular to the flexible substrate 31, and the substrate conductive layer 37 does not intersect the bottom electrode 36 in the direction perpendicular to the flexible substrate 31, thereby reducing a possibility that a short circuit occurs due to a shift of the top electrode 33, the bottom electrode 3, or the substrate conductive layer 37 caused by applying external stress to the sensing layer 30.

As shown in FIG. 5 and FIG. 6, in the temperature sensing unit, the two end electrodes 34 and 35 are disposed between the surface of the flexible substrate 31 and the thermal conductive fiber, and are respectively in contact with bottom surfaces of the two ends of the thermal conductive fiber. Preferably, the two end electrodes 34 and 35 extend separately to an edge of the flexible base 31, so that the temperature sensing unit is electrically connected to the external power supply system.

In addition, the thermal conductive fiber does not intersect or is not in contact with the thermal conductive fiber itself, and the two end electrodes 34 and 35 are not in contact with each other. Preferably, the two end electrodes 34 and 35 do not intersect each other in the direction perpendicular to the flexible substrate 31, so as to reduce a possibility that a short circuit occurs due to a shift of the two end electrodes 34 and 35 caused by applying external stress to the sensing layer 30.

The top electrode 33, the substrate conductive layer 37, and the two end electrodes 34 and 35 can be prepared by using a conventional electrode material, and printed on the surface of the flexible substrate 31 based on corresponding routes and shapes shown in FIG. 2, FIG. 3, and FIG. 5.

The stress sensing unit and the temperature sensing unit are not in contact with each other, so as to ensure that the stress sensing unit and the temperature sensing unit can work independently of each other.

The elastic layer 20 is annular and is disposed along an edge of the flexible substrate 31, and surrounds the conductive fiber 32. The stress-bearing layer 10 is disposed on the elastic layer 20, and covers the flexible substrate 31. The stress-bearing layer 10 is prepared by using a flexible insulating material, for example, a flexible film material. The elastic layer 20 is prepared by using an elastic insulating material. The stress-bearing layer 10 and the elastic layer 20 form package protection for the sensing layer 30 and a cushion space between the stress-bearing layer 10 and the sensing layer 30. Therefore, when very small stress of a non-measurement target acts on the stress-bearing layer 10, the sensing layer 30 is not subject to the very small stress, thereby avoiding the stress sensor unit from generating unnecessary detection signals.

When the tactile sensor works, the top electrode 33 and the bottom electrode 36 are separately connected to the external power supply system, so that the top electrode 33, the bottom electrode 36, the flexible conductive fiber, and the external power supply system form a complete conductive loop, and a current flows along the radial direction of the flexible conductive fiber. In this case, the stress sensing unit can detect stress applied to the flexible conductive fiber. Specifically, a resistance of the flexible conductive fiber changes with stress, and a value of the stress applied to the flexible conductive fiber can be obtained by detecting a voltage between the top electrode 33 and the bottom electrode 36. The two end electrodes 34 and 35 are separately connected to the external power supply system, so that the two end electrodes 34 and 35, the thermal conductive fiber, and the external power supply system form a complete conductive loop, and a current flows along the axial direction of the thermal conductive fiber. In this case, the temperature sensing unit can detect a temperature near the thermal conductive fiber. Specifically, a resistance of the thermal conductive fiber changes with a temperature, and an instant temperature near the thermal conductive fiber can be obtained by detecting a resistance between the two ends of the thermal conductive fiber.

The stress sensing unit and the temperature sensing unit can detect stress and a temperature at the same time, and detection of stress and that of a temperature are independent of each other, without mutual impact or interference. Specifically, the two conductive loops formed by the external power supply system separately with the stress sensing unit and the temperature sensing unit are independent of each other, and a single chip microcomputer can be used to separately control connection and disconnection of the two conductive loops, so as to selectively detect stress or a temperature.

In addition to this embodiment, there are multiple implementations for the tactile sensor in the present disclosure. For example, the flexible conductive fiber of the stress sensor unit and the thermal conductive fiber of the temperature sensing unit are respectively selected from two separate segments in the middle of the same conductive fiber 32, instead of end segments. For another example, the flexible conductive fiber of the stress sensing unit and the thermal conductive fiber of the temperature sensing unit are two different conductive fibers. For still another example, there are more than one stress sensing unit and more than one temperature sensing unit, where the flexible conductive fibers of all the stress sensing units and the thermal conductive fibers of all the temperature sensing units share a same conductive fiber, or can be different conductive fibers.

Embodiment 2

Figure 7:
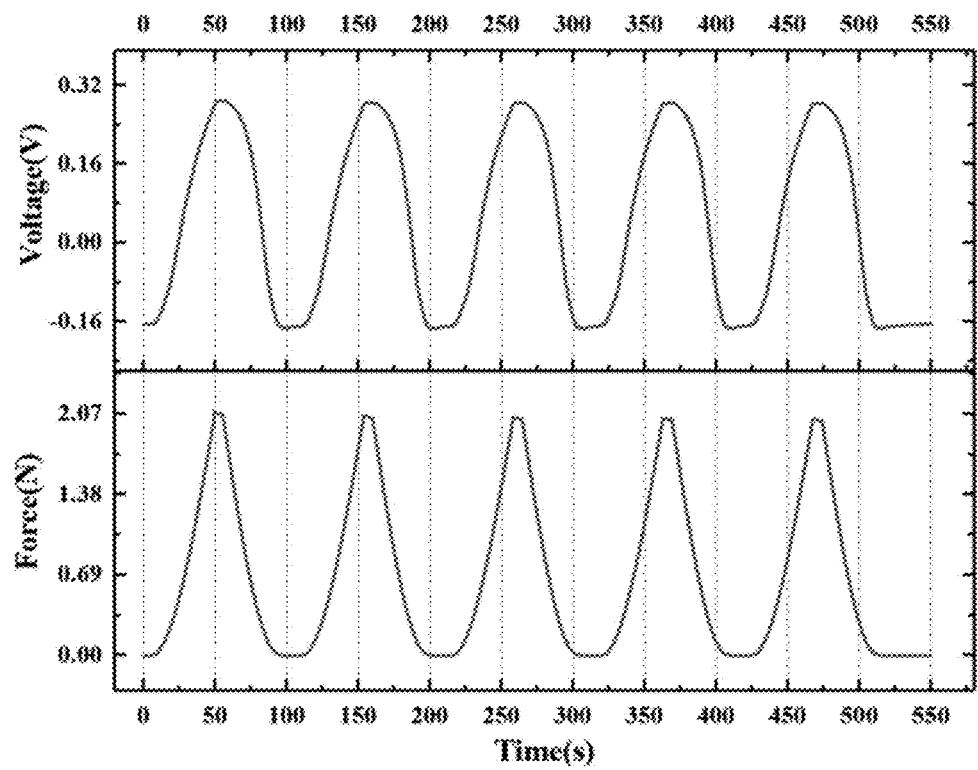
FIG. 7 shows a performance test result of a stress sensing unit.

FIG. 7 is a diagram of performance test data of a stress sensing unit. Stress with a peak value of 2 N is applied to the tactile sensor in Embodiment 1, and a dynamic stress loading test from 0 N to 2 N is performed on the stress sensing unit of the tactile sensor. A test result is shown in FIG. 7. An upper curve in the figure is a curve of stress changing with time, and a lower curve is a curve of a voltage between the bottom electrode 36 and the substrate conductive layer 37 (that is, a voltage between the top and bottom of the flexible conductive fiber) changing with time. It can be seen from the figure that, in a cyclic test, a voltage output by the stress sensing unit increases with stress. When the stress reaches a peak value, the voltage also reaches a peak value, fully indicating that the tactile sensor in the present disclosure is capable of quickly responding to dynamic stress and has an excellent dynamic identification capability. The stress sensing unit presents good consistency in five cyclic tests, indicating that the tactile sensor in the present disclosure has good stability for stress detection.

Figure 8:
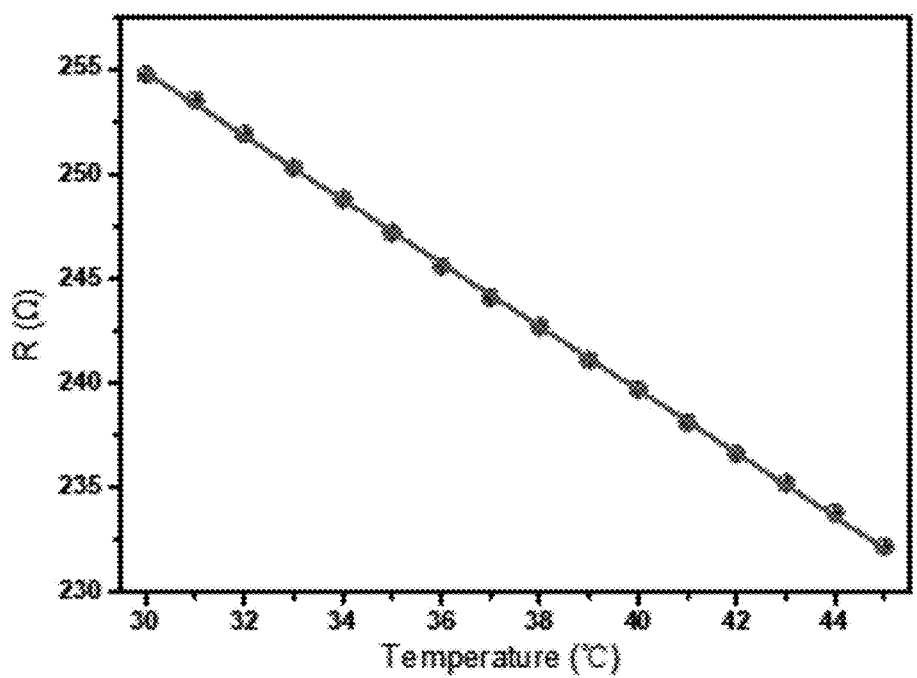
FIG. 8 shows a performance test result of a temperature sensing unit.

FIG. 8 is a diagram of performance test data of a temperature sensing unit. A temperature in an environment of the tactile sensor in Embodiment 1 is changed to test a resistance reflected by the temperature sensing unit at different temperatures. A test result indicates that the resistance of the temperature sensing unit (that is, a resistance between two ends of the thermal conductive fiber) decreases as a temperature increases, that is, the resistance is negatively correlated with a temperature. Subsequently, data is further fitted, and it is found that the temperature sensing unit has good linearity in a temperature range of 30° C. to 45° C., as shown in a curve in FIG. 8. Therefore, a temperature measurement range of the tactile sensor in the present disclosure can be 30° C. to 45° C., which is relatively close to a temperature change range of a human body. The tactile sensor has a great prospect in industrial and life applications, and particularly has a great technical advantage in dynamic body temperature detection.

The foregoing embodiments represent only several implementations of the present disclosure, and descriptions thereof are relatively specific and detailed, but cannot be construed as a limitation on the scope of the present disclosure. It should be noted that a person of ordinary skill in the art can further make some improvements and variations without departing from the idea of the present disclosure, and the improvements and variations shall fall within the protection scope of the present disclosure.

The invention claimed is:

1. A new tactile sensor, comprising a sensing layer, comprising:
    a flexible substrate;
    at least one stress sensing unit comprising:
        a flexible conductive fiber that is laid flat on the flexible substrate;
        a top electrode that is bendable and is in electrical contact with a top of the flexible conductive fiber; and
        a bottom electrode that is in electrical contact with a bottom of the flexible conductive fiber, wherein when there is a potential difference between the top electrode and the bottom electrode, a current flows along a radial direction of the flexible conductive fiber;
    at least one temperature sensing unit comprising:
        a thermal conductive fiber that is laid flat on the flexible substrate; and
        two end electrodes that are respectively and electrically connected to two ends of the thermal conductive fiber, wherein when there is a potential difference between the two end electrodes, a current flows along an axial direction of the thermal conductive fiber; and
    an elastic layer and a stress-bearing layer that are disposed on the sensing layer, wherein the elastic layer is annular and is arranged along an edge of the flexible substrate such that a cushion space is formed between the stress-bearing layer and the sensing layer, and the stress-bearing layer is disposed on the elastic layer and covers the flexible substrate.

2. The new tactile sensor according to claim 1, wherein a resistance of the thermal conductive fiber is characterized by a negative temperature coefficient.

3. The new tactile sensor according to claim 2, wherein the thermal conductive fiber is a carbon fiber doped with impurity ions, or is a composite fiber obtained by blending an aramid fiber with a carbon fiber doped with impurity ions.

4. The new tactile sensor according to claim 3, wherein flexible conductive fibers of all stress sensing units and thermal conductive fibers of all temperature sensing units share a same conductive fiber.

5. The new tactile sensor according to claim 4, wherein the sensing layer comprises one stress sensing unit and one temperature sensing unit, and the flexible conductive fiber of the stress sensing unit and the thermal conductive fiber of the temperature sensing unit are respectively selected from two separated segments of a same conductive fiber; and in the stress sensing unit, the top electrode is disposed on a middle portion of the flexible conductive fiber, and is in contact with a top surface of the flexible conductive fiber, and the bottom electrode is in contact with bottom surfaces of two ends of the flexible conductive fiber.

6. The new tactile sensor according to claim 5, wherein a ratio of a length of the thermal conductive fiber of the temperature sensing unit to a diameter of the flexible conductive fiber of the stress sensing unit is greater than 20:1.

7. The new tactile sensor according to claim 1, wherein hardening processing is performed on the thermal conductive fiber.

8. The new tactile sensor according to claim 1, wherein the top electrode is a metal dome, liquid metal, or conductive silver paste.

9. The new tactile sensor according to claim 1, wherein the stress sensing unit and the temperature sensing unit are not in contact with each other; in the stress sensing unit, the flexible conductive fiber does not intersect or is not in contact with the flexible conductive fiber itself, and the top electrode and the bottom electrode are not in contact with each other; and in the temperature sensing unit, the thermal conductive fiber does not intersect or is not in contact with the thermal conductive fiber itself, and the two end electrodes are not in contact with each other.

* * * * *